May 21, 1957  S. P. J. ELLIS  2,793,085
APPARATUS FOR STORING AND TRANSPORTING POWDERED MATERIAL
Filed April 6, 1954  2 Sheets-Sheet 1

United States Patent Office 2,793,085
Patented May 21, 1957

2,793,085

APPARATUS FOR STORING AND TRANSPORTING POWDERED MATERIAL

Stanley Peter John Ellis, London, England, assignor to Blaw Knox Limited, London, England, a British company Application April 6, 1954, Serial No. 421,314

Claims priority application Great Britain March 4, 1954

11 Claims. (Cl. 302—55)

This invention relates to apparatus for storing and transporting powdered material.

According to the present invention there is provided apparatus for storing and transporting powdered material comprising a blowing cylinder, and a container for powdered or granular material, the container being arranged for filling the material into the blowing cylinder and the latter being arranged periodically to blow the material contained therein through an outlet to the blowing cylinder, there being a first valve for controlling the filling of the blowing cylinder with the material and a second valve for controlling the blowing of the cylinder, and there being means for aerating the material prior to its introduction to the blowing cylinder.

Figure 1:
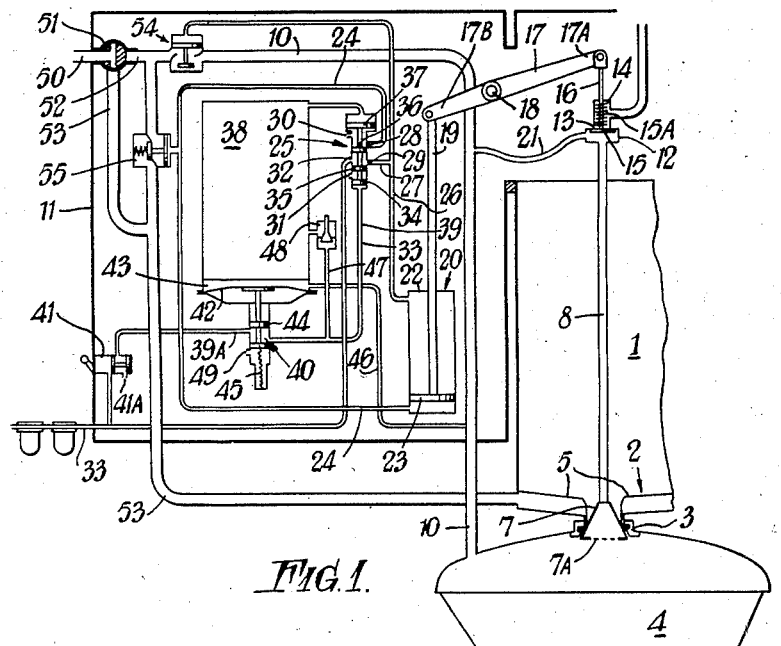
Figure 2:
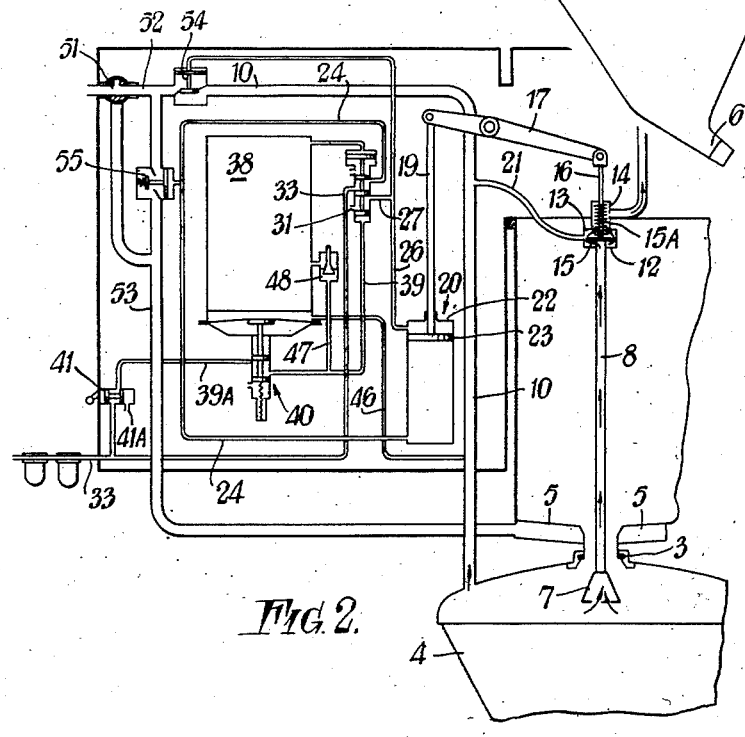
Figure 3:
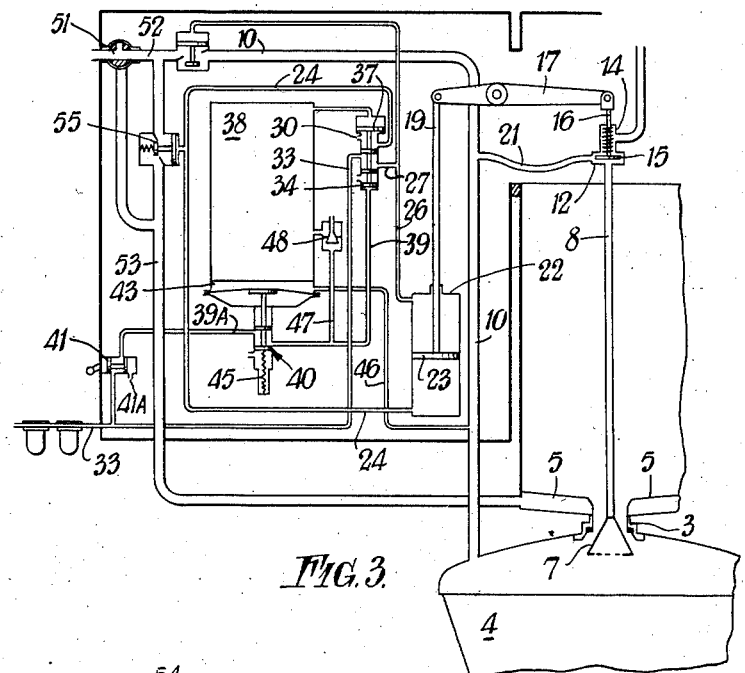
Figure 4:
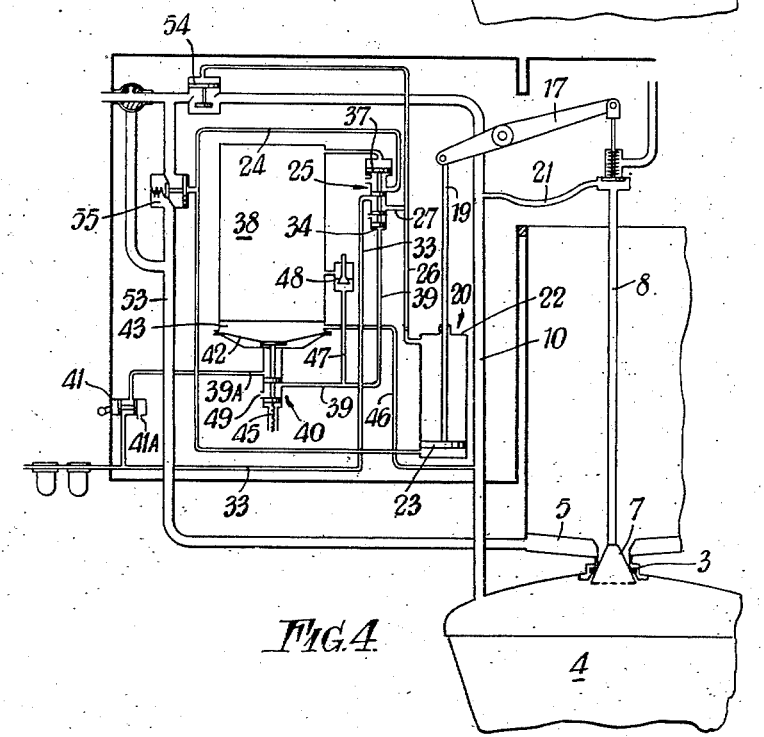

For a better understanding of the invention and the method of carrying the same into effect, reference will now be made to the accompanying drawings, in which:

Figure 1 is a diagrammatic part-sectional elevation of part of an apparatus for storing and transporting powdered material, and Figures 2 to 4 are similar to Figure 1 but showing the working parts of the apparatus in different operative positions.

The storing and transporting apparatus has a container 1 for storing cement or other powdered or granular material. The container 1 has a sloping floor 2 forming a chute for directing the contents of the container to the inlet 3 of a small so-called blowing "cylinder" 4. The sloping floor 2 is provided with Fuller Company "air slides" having porous plates 5 connected to have low pressure air blown therethrough to assist the movement of powdered cement towards the blowing cylinder inlet 3.

The blowing cylinder 4 essentially consists of a hollow conical shaped container disposed vertex downwards. An outlet 6 is located at the vertex. The inlet 3 is at the top of the container immediately above the outlet 6. A hollow valve head 7 having a perforated bottom 7A and carried by a hollow vertically disposed valve stem 8 is provided for opening and closing the blowing cylinder inlet 3. The valve head 7 is mounted on the stem 8 so that in the lower position of the latter the inlet 3 is open and in the upper position of the stem 8, the inlet 3 is closed. The outlet 6 is adapted to have a delivery pipe connected thereto for conveying powdered cement to the desired location.

A pipe 10 for delivering compressed air under pressure to the blowing cylinder 4 communicates with the top portion of the latter. The stem 8 and pipe 10 lead from the blowing cylinder 4 to the control unit 11.

The valve stem 8 is guided for vertical movement by means, not shown, and the upper end of the stem communicates with a hollow cylindrical container 12. The upper side of the container 12 communicates via a pipe 21 with the pipe 10 and via a valve orifice 13 with a chamber 14 open to atmosphere. A valve head 15 carried on a stem 16 co-operates with the orifice 13, the stem 16 being pivotally suspended from one end 17A of a lever 17. The lever 17 is pivotally supported at 18 and has the piston rod 19 of a pneumatic ram 20 pivotally secured to the end 17B thereof. In the position shown in Figure 1 the valve head 15 urges the container 12 upwardly, whereby the inlet 3 is maintained closed by the valve head 7. A spring 15A is provided for urging the valve head 15 away from the orifice 13.

The ram 20 consists of a ram cylinder 22 and a piston 23 which latter is secured on the rod 19. The lower end of the ram cylinder 22 is connected by a pipe 24 to a piston and cylinder type change-over valve 25. The upper end of the cylinder 22 is connected to the change-over valve 25 by pipes 26 and 27. The valve 25 has ports 28 and 29 with which the pipes 24 and 27 communicate respectively. The cylinder of this valve also has exhaust ports 30 and 31 and a high pressure port 32 with which a pipe 33 leading from a high pressure source of air (not shown) communicates. The valve 25 has three pistons 34, 35, 36 of the same diameter, and a fourth piston 37 at the upper end thereof, the fourth piston being located in an enlarged cylindrical portion of the valve. The upper end of the valve 25 communicates with the upper end of an air reservoir 38 and the lower end of the valve is connected via a pipe 39, a diaphragm operated valve 40, a pipe 39A and a main air valve 41 with the pipe 33. The air valve 41 has an exhaust port 41A with which the pipe 39A communicates when the latter is not connected to the air supply pipe 33. The valve 40 essentially consists of a diaphragm 42 forming one wall of a pressure chamber 43, the central part of the diaphragm being connected to a valve member 44 for connecting the pipe 39 either to the pipe 39A or to an exhaust port 49. A spring 45 acts on the member 44 in opposition to the diaphragm 42. The chamber 43 communicates via a pipe 46 with the pipe 10.

The pipe 39 is connected to the reservoir 38 by way of a conduit 47 and a bleed valve 48. The bleed valve 48 permits restricted flow of air into the reservoir 38 when the pressure in the pipe 39 is higher than that in the reservoir, and permits relatively but not completely unrestricted flow of air from the reservoir 38 via the pipe 47 when the valve 40 connects the pipe 39 to the exhaust port 49.

A pipe 50 leads from a low pressure air source (not shown) to a three-way valve 51 which is arranged for delivering low pressure air either to a pipe 52 or to a pipe 53. The pipe 52 communicates via a pneumatically operated valve 54 with the pipe 10. The valve 54 is operated in accordance with the pressure in the pipe 26. When this pipe 26 is connected to the high pressure air supply pipe 33, the valve 54 is opened, whereas at other times the valve 54 is closed.

The pipe 53 leads to the porous plates 5 of the air slides and is connected for communication with the pipe 52 via a pneumatically controlled valve 55. The valve 55 is controlled in accordance with the pressure in the pipe 24. When the pressure in this latter pipe is high, the valve 55 is opened, whereas at other times it is closed.

It is to be understood that the manner in which the apparatus is represented in the drawings is diagrammatic and that in an actual construction the valves 25, 40, 41, 51, 54 and 55 can all be incorporated in one unit.

The apparatus described above operates as follows. With the working parts as shown in Figure 1, high pressure air is fed by the pipe 33 through the valve 25 to the pipe 27 and thence to the pipe 26 and the upper end of the ram cylinder 22, whereby the piston is maintained at its lowermost position in the cylinder. The valve head 7 therefore maintains the inlet 3 closed. The valve 51 is positioned to supply low pressure air to the pipe 53 and hence to the air slides so that cement in the container 1 is aerated. Since the valve 54 has high pressure air communicating therewith this valve is open but no air flows therethrough because the valve 51 is not positioned to supply air to the pipe 52. To commence automatic filling and blowing of the blowing cylinder 4, the valve 41 is opened (Figure 2) and the valve 51 is positioned to supply low pressure air to the pipe 52. Opening of the valve 41 feeds high pressure air to the pipe 39A through the valve 40 to the pipes 47 and 39. Air flows at a restricted rate from the pipe 47 through the valve 48 into the reservoir 38. Hence the pressure of air in the reservoir builds up at a relatively slow rate. The pipe 39 leads high pressure air to the lower side of the piston 34 and as only a low pressure prevails on the upper side of the piston 37, the pistons 34 to 37 are displaced upwardly whereby the pipe 24 is placed in communication with the high pressure pipe 33 and the pipe 27 communicates with the exhaust port 31. The upper end of the ram cylinder 22 therefore communicates with exhaust and high pressure air is fed to the lower end of this cylinder via the pipe 24. The piston 23 is therefore displaced upwardly and the container 12, valve stem 8 and valve head 7 move downwardly whereby the inlet 3 is opened so that cement flows along the plates 5 and into the blowing cylinder 4. When the stem 16 moves downwardly the valve head 15 disengages from the seating formed by the orifice 13 whereby the stem 8 and head 7 become supported through the intermediary of the spring 15A located in the chamber 14. It is to be understood that when this happens the valve head 15 does not move downwardly relatively to the container 12 sufficiently far to blank-off the upper end of the hollow stem 8. Whilst cement flows into the blowing cylinder 4 through the annular gap formed between the stem 8 and the inlet 3, air is displaced from the blowing cylinder upwardly through the hollow valve head 7 and stem 8 to the container 12 and from thence to the chamber 14 and to exhaust.

As the pipe 24 has high pressure air therein the valve 55 is open so that the pipe 53 still has low pressure air fed therethrough to the plates 5.

After a period of time the blowing cylinder 4 becomes filled with cement powder and the pressure of air in the reservoir 38 has risen to a sufficiently high value to cause the pistons 34 to 37 to move downwardly (Figure 3). This happens in spite of the fact that the pipe 39 is connected to the high pressure air supply, since the area of the piston 37 is greater than the area of the piston 34. Downward movement of these pistons places the pipe 24 in communication with the exhaust port 30 and the pipe 27 in communication with the high pressure air supply pipe 33. The lower end of the cylinder 22 is therefore connected to exhaust and high pressure air is fed to the upper end of the cylinder 22 so that the piston 23 commences to move downwardly. The valve member 7 therefore commences to close the blowing cylinder inlet 3. Since the pressure in the pipe 24 has fallen to atmospheric the valve 55 has become closed and hence no low pressure air is fed via the pipe 53 to the plates 5. High pressure air in the pipe 26 causes the valve 54 to open whereby low pressure air is fed through the pipe 10 to the blowing cylinder 4 and also via the pipe 21 and hollow valve stem 8 to the blowing cylinder 4. Such feeding of air to the blowing cylinder 4 causes cement in the blowing cylinder to be blown through the outlet 6 in a continuous stream. The passageways through the stem 8 and head 7 are cleaned by the air flowing therethrough during the blowing period.

As soon as the inlet 3 is closed by the valve head 7 (Figure 4), pressure in the pipe 10 builds up to a higher value thus causing the pressure in the chamber 43 to rise sufficiently to enable the diaphragm 42 to overcome the opposition of the spring 45 and change the position of the valve 40 so that the pipe 39 is placed in communication with the exhaust port 49. The reservoir 38 is therefore exhausted through the valve 48, pipe 47, pipe 39 and valve 40. The change-over valve 25 remains in the same position as the upper and lower ends of the valve 25 now communicate with each other. Air continues to be fed to the blowing cylinder 4 via the pipe 10 and valve stem 8 until the blowing cylinder 4 becomes emptied of cement, whereupon the pressure therein falls. Such fall in pressure lowers the pressure in the pipe 10 and hence the pressure in the chamber 43 is also lowered. The spring 45 thereupon re-asserts itself and the pipe 39 is placed in communication with the pipe 39A instead of with the exhaust port 49. This causes the parts to return to the positions indicated in Figure 2 and filling of the blowing cylinder 4 with cement then takes place. The filling and blowing cycle continues until such time as the valve 41 is closed. At whatever point in the cycle the valve 41 is closed, the apparatus continues to operate until the blowing cylinder 4 is emptied of cement, the apparatus ceasing operation with the parts in the positions shown in Figure 1 (apart from the valve 51). If the valve 41 is closed during filling (Figure 2) the pipe 39A is placed in communication with the exhaust port 41A. The pressure in the pipe 39 immediately drops to atmospheric pressure, whereas the pressure at the upper end of the valve 25 drops at a somewhat slower rate due to the slight restriction to air flow from the reservoir 38 to exhaust via the pipes 47, 39 and 39A and port 41A, caused by the valve 48. The valve 25 therefore changes its position to that of Figures 2 and 3 and blowing takes place, operation of the apparatus ceasing at the end of the blowing period because no high pressure air is available in the pipe 39 to cause the valve 25 to assume the Figure 2 position. If the valve 41 is closed during blowing, the blowing period is completed and the apparatus ceases operation as mentioned in the last sentence.

It will be noted that immediately prior to entry into the blowing cylinder 4, the cement is aerated by the air issuing from the porous plates 5. It is found that such pre-filling aeration greatly facilitates subsequent blowing of the material from the blowing cylinder 4. If non-aerated material is fed to the blowing cylinder the outlet 6 tends to become clogged and blowing is rendered difficult.

I claim:

1. Apparatus for storing and transporting powdered material comprising a blowing cylinder having an inlet and a discharge outlet, a storage container for material and communicating with said inlet, means whereby material within said container may be aerated to facilitate its passage to said cylinder, a first valve controlling the flow of material from said container to said cylinder so that filling of the latter will take place on opening of said valve, a pneumatic ram for actuating said valve, a pneumatically operated changeover valve for controlling the supply of air under pressure to one or other side of said ram, an air reservoir to which air is supplied simultaneously with air to the changeover valve for positioning the latter so that air will be supplied to the ram to effect opening of said first valve, means whereby the supply of air to said reservoir will be controlled so that the pressure therein will build up slowly to a predetermined value whereat it will be effective to reverse the changeover valve thereby to cause reversal of the ram and closure of said first valve, a further valve operable under the pressure of air delivered to the ram to effect closure of said first valve, to allow admission of air to the blowing cylinder thereby to blow material present therein through said discharge outlet and pressure sensitive means communicating with the interior of the cylinder and operative to cause air to be supplied to said air reservoir and to said changeover valve to effect opening of said first valve when the pressure in said cylinder drops below a predetermined value.

2. Apparatus for storing and transporting powdered material as claimed in claim 1 and further comprising a master valve operable to control the supply of air under pressure to the air reservoir and the changeover valve both for actuating the latter and also for supply to the ram.

3. Apparatus for storing and transporting powdered material comprising a blowing cylinder having an inlet and a discharge outlet, a storage container for material and communicating with said inlet, means whereby material within said container may be aerated to facilitate its passage to said cylinder, a first valve controlling the flow of material from said container to said cylinder so that filling of the latter will take place on opening of said valve, a pneumatic ram for actuating said valve, a pneumatically operated changeover valve for controlling the supply of air under pressure to one or other side of said ram, an air reservoir to which air is supplied simultaneously with air to the changeover valve for positioning the latter so that air will be supplied to the ram to effect opening of said first valve, means whereby the supply of air to said reservoir will be controlled so that the pressure therein will build up slowly to a predetermined value whereat it will be effective to reverse the changeover valve thereby to cause reversal of the ram and closure of said first valve, a third valve operable under the pressure of air delivered to the ram for closing the first valve, to allow admission of air to the blowing cylinder thereby to blow material present therein through said discharge outlet, a pressure sensitive device communicating with the interior of the cylinder and a further valve, coupled to said device so that when the pressure in the cylinder reaches a predetermined value said further valve will be operated to cut off the supply of air to the reservoir and to the changeover valve and to connect the same to exhaust whereas when the pressure in said cylinder falls on emptying of the material therefrom said further valve will be actuated to cause air under pressure to be again supplied to the reservoir and to the changeover valve to initiate a further cycle of operation.

4. Apparatus for storing and transporting powdered material as claimed in claim 3 and further comprising a master valve operable to control the supply of air under pressure to the air reservoir and the changeover valve both for actuating the latter and also for supply to the ram.

5. Apparatus for storing and transporting powdered material comprising a blowing cylinder having an inlet and a discharge outlet, a storage container for material and communicating with said inlet, a first valve controlling the flow of material from said container to said cylinder so that filling of the latter will take place on opening of said valve, a pneumatic ram for actuating said valve, a pneumatically operated changeover valve for controlling the supply of air under pressure to one or other side of said ram, an air reservoir to which air is supplied simultaneously with air to the changeover valve for positioning the latter so that air will be supplied to the ram to effect opening of said first valve, means whereby the supply of air to said reservoir will be controlled so that the pressure therein will build up slowly to a predetermined value whereat it will be effective to reverse the changeover valve thereby to cause reversal of the ram and closure of said first valve, a further valve operable under the pressure of air delivered to the ram to effect closure of said first valve, to allow admission of air to the blowing cylinder thereby to blow material present therein through said discharge outlet, pressure sensitive means communicating with the interior of the cylinder and operative to cause air to be supplied to said air reservoir and to said changeover valve to effect opening of said first valve when the pressure in said cylinder drops below a predetermined value, a porous support within the container and upon which the material for supply to the cylinder is supported, conduit means for leading air beneath said porous support for aerating said material, a control valve operable to supply air to said conduit means when the first valve is closed and pressure sensitive means operable on supply of air under pressure to said ram to effect opening of said first valve to allow air to be supplied to said conduit means despite closure of the control valve.

6. Apparatus for storing and transporting powdered material as claimed in claim 3 and further comprising a master valve operable to control the supply of air under pressure to the air reservoir and the changeover valve both for actuating the latter and also for supply to the ram.

7. Apparatus for storing and transporting powdered material comprising a blowing cylinder having an inlet and a discharge outlet, a storage container for material and communicating with said inlet, a first valve controlling the flow of material from said container to said cylinder so that filling of the latter will take place on opening of said valve, a pneumatic ram for actuating said valve, a pneumatically operated changeover valve for controlling the supply of air under pressure to one or other side of said ram, an air reservoir to which air is supplied simultaneously with air to the changeover valve for positioning the latter so that air will be supplied to the ram to effect opening of said first valve, means whereby the supply of air to said reservoir will be controlled so that the pressure therein will be built up slowly to a predetermined value whereat it will be effective to reverse the changeover valve thereby to cause reversal of the ram and closure of said first valve, a further valve operable under the pressure of air delivered to the ram to effect closure of the first valve, to allow admission of air to the blowing cylinder thereby to blow material present therein through said discharge outlet, pressure sensitive means communicating with the interior of the cylinder and operative to cause air to be supplied to said air reservoir and to the changeover valve to effect opening of said first valve when pressure on said cylinder drops below a predetermined value, and a further outlet for said blowing cylinder to allow escape of air displaced when material is fed to said cylinder such further outlet being other than the space through which the material flows into said cylinder.

8. Apparatus for storing and transporting powdered material as claimed in claim 7 in which said further outlet comprises a passageway in said first valve, there being means operable as a result of opening movement of said first valve, to open said passageway to atmosphere and to close the same to atmosphere or closing movement of said first valve.

9. Apparatus for storing and transporting powdered material as claimed in claim 7 in which said further outlet comprises a passageway in said first valve, there being means operable as a result of opening and closing movements of said first valve respectively to open and close said passageway to atmosphere and further means whereby air will be supplied through said passageway to said cylinder during blowing of the latter.

10. Apparatus for storing and transporting powdered material comprising a blowing cylinder having air inlet and a discharge outlet, a storage container for material and communicating with said inlet, means whereby the material within said container may be aerated to facilitate its passage to said cylinder, a first valve means controlling the flow of material from said container to said cylinder so that filling thereof will take place on opening of said valve means, a second valve means adapted on operation to effect closure of said first valve means and to allow air to be supplied to the cylinder to blow the material therein through said discharge outlet, delay means whereby the apparatus will change from filling to blowing after a predetermined delay period, means whereby the operation of said respective valve means may be reversed on emptying of the cylinder to allow refilling thereof, a master control means for controlling the operation of the apparatus and means for ensuring that the apparatus will continue to operate until the cylinder is emptied of material irrespective of whether said master control means is moved to the shut off position during either filling or blowing of said cylinder.

11. Apparatus for storing and transporting powdered material comprising a blowing cylinder having an inlet and a discharge outlet, a storage container for material and communicating with said inlet, means whereby the material within said container may be aerated to facilitate its passage to said cylinder, a first pneumatically operated valve controlling the flow of material from said container to said cylinder so that filling thereof will take place on opening of said valve, a second pneumatically operated valve adapted on operation to effect closure of said first valve and to allow air to be supplied to the cylinder to blow the material therein through said discharge outlet, pneumatic delay means whereby the apparatus will change from filling to blowing after a predetermined period, means whereby reversal of operation of said valves will be effected automatically on emptying of the cylinder to allow for refilling thereof, a master control valve for controlling the supply of air to the apparatus as a whole and means for ensuring that the apparatus will continue to operate until the cylinder is emptied of material irrespective of whether said master valve is operated to shut off the air supply to the apparatus during either filling or blowing of said cylinder.

References Cited in the file of this patent
UNITED STATES PATENTS

| | | |
|---|---|---|
| 1,935,843 | Goebels | Nov. 21, 1933 |
| 2,221,741 | Vogel-Jorgensen | Nov. 12, 1940 |
| 2,602,707 | Garoutte | July 8, 1952 |
| 2,657,100 | Weller | Oct. 27, 1953 |
| 2,668,085 | Baresch | Feb. 2, 1954 |
| 2,678,240 | Snow | May 11, 1954 |